United States Patent [19]

Reese et al.

[11] Patent Number: 4,626,267
[45] Date of Patent: Dec. 2, 1986

[54] METHOD AND APPARATUS TO REDUCE TIP CURL OF A GLASS SHEET ON A BENDING MOLD

[75] Inventors: Thomas J. Reese, Sarver; David B. Rayburn, Vandergrift; William P. Cathers, Allison Park, all of Pa.

[73] Assignee: PPG Industries, Inc., Pittsburgh, Pa.

[21] Appl. No.: 776,279

[22] Filed: Sep. 16, 1985

[51] Int. Cl.⁴ ............................................. C03B 23/023
[52] U.S. Cl. .......................................... 65/106; 65/107; 65/273; 65/289
[58] Field of Search ................. 65/106, 107, 273, 287, 65/289, 290

[56] References Cited

U.S. PATENT DOCUMENTS

| | | | |
|---|---|---|---|
| 3,220,819 | 11/1965 | Jendrisak | 65/290 |
| 4,015,969 | 4/1977 | Brown et al. | 65/289 |
| 4,077,791 | 3/1978 | Oelke | 65/273 |
| 4,173,461 | 11/1979 | Ebata et al. | 65/106 |
| 4,193,785 | 3/1980 | Bailey | 65/285 |
| 4,496,386 | 1/1985 | Hymore et al. | 65/106 |

*Primary Examiner*—Arthur Kellogg
*Attorney, Agent, or Firm*—Andrew C. Siminerio

[57] ABSTRACT

A method and apparatus for reducing tip curl caused by sag bending complicated shapes in glass sheets. A pivoting assembly with a glass edge roller contacts the edge of the glass sheet as it is conveyed through a heating lehr or a bending mold, and biases the glass against the bending rail.

20 Claims, 6 Drawing Figures

METHOD AND APPARATUS TO REDUCE TIP CURL OF A GLASS SHEET ON A BENDING MOLD

BACKGROUND OF THE INVENTION

1. Field of the Invention

This invention relates to sag bending of glass sheets in a bending lehr and in particular to a method and apparatus to reduce tip curl caused by sag bending complicated shapes in glass sheets.

2a. Technical Considerations

The techniques of sag bending to form shaped glass windows for automobiles and the like, as disclosed in U.S. Pat. No. 4,375,978 to Reese, is well known. Glass sheets are positioned on and supported by a skeletal bending mold. The shaping rail of the mold conforms to the shape and final configuration of the glass sheet to be shaped, slightly inboard of the edge of the glass. The bending molds are then conveyed in succession through a heating lehr where the glass is heated to its deformation temperature and begins to sag by gravity until the glass sheet conforms to the configuration of the shaping rail. After the glass sheets have properly deformed, the molds are conveyed through an annealing zone where the glass sheets are cooled, in a controlled manner, from their deformation temperature through their annealing range to anneal the glass sheets.

The glass sagging technique has been the method used to bend two glass sheets simultaneously, which sheets are subsequently laminated together to form a laminated automobile windshield. The windshield is curved to conform and blend into the shape of an automobile vehicle in which it is installed.

In recent years, automobile stylists have demanded more complex and deeper bends in glass doublets used in windshields. When glass sheets are shaped to relatively deep bends, the length of the chord between the ends of the bent glass is shorter than the distance between the ends of the flat glass sheet before bending. In order to reduce relative sliding between the glass ends and the shaping rail which marks the glass, the mold rail comprises articulated rail sections including an end rail section whose contour conforms to the outline and shape desired for the longitudinal end portion of the glass sheet to be bent. The end rail section is constructed and counterweighted to pivot downward into a lower position to support the mass of a relatively stiff flat glass sheet to be bent, and when the glass sheet is softened by heat, to pivot upward into an upper position where it cooperates with additional shaping rails to form a substantially continuous outline shaping surface conforming in contour and elevation to the shape desired for the glass sheet. When the desired final configuration is particularly complex such as required very deep bends and/or reverse curvatures, the heat pattern within the lehr can be adjusted to direct localized heat toward these critical bend areas.

It has been found that with complex deep bends, the outermost portions of the longitudinal end portions, or tips, of the glass sheets tend to curl and lift off portions of the end rail section causing the sheets to deviate from desired tolerances. This tip curl is caused by the tendency of the sheets to draw glass from its end sections when there is a deep sag or a reverse curve. It can also be caused by overheating the tip areas to achieve proper curvature along the outer edge of the longitudinal section, or A post, of the glass sheet. The local heat tends to preheat the glass at the tip area causing it to rise off the end rail section. The tip does not get a chance to relax and sag back onto the end rail.

It would be advantageous to develop a method of forming glass sheets to the new complex and deep sag configurations while maintaining the desired outline configuration.

2b. Patents of Interest

U.S. Pat. Nos. 4,015,969 to Brown et al. and 4,077,791 to Oelke teach an apparatus for bending glass to a relatively sharp angle. A contact assembly is positioned over the edge of the glass sheet and engages a conductor element on a surface of the sheet throughout the bending operation. The contact assembly is held in positive engagement with the surface of the sheet by a spring mechanism so that contact is maintained despite vertical translation of the conductor elements. When the sheet is fully bent, contact assemblies must be rotated off the surface of the glass to allow its removal.

U.S. Pat. No. 4,173,461 to Ebata et al. teaches the bending of hot glass sheets wherein the edge of the sheet is positively clamped to the top of a bending table to maintain one edge of the sheet against the table during bending. The glass is heated to its deformation temperature and droops on account of its own dead weight onto the table where it assumes the contour and configuration of the top. The clamped edge of the sheet remains in contact with the table throughout the bending operation and the clamps must be removed in order to remove the shaped glass.

U.S. Pat. No. 4,193,785 to Bailey teaches the use of opposed locator stops on a glass bending mold. The stops contact the edge of the glass sheet to be bent and exert pressure on the ends of the sheet while maintaining the sheet in proper relation to the mold throughout the bending operation. The locator stops contact only the edge of the glass and do not provide a means for maintaining positive contact of the glass sheet against the bending mold.

SUMMARY OF THE INVENTION

The present invention provides an apparatus for reducing the movement of an edge of a glass sheet away from a shaping rail of a bending mold while said glass sheet is conveyed through a heating lehr on the bending mold to heat. The apparatus includes an edge contacting roller that biases the roller against the glass sheet edge against said shaping rail as the glass sheet is conveyed through the lehr. The roller is mounted on a pivoting frame that pivots from a first position wherein the roller is spaced from the glass edge, to a second position wherein the roller engages the glass edge. The frame is generally parallelogram in shape and pivots in a plane generally perpendicular to the lehr. The edge contacting roller maintains a constant downward inclined orientation relative to one of a side member of the frame while in contact with the glass sheet edge. The apparatus further includes an air cylinder pivotally connected to frame. The cylinder pivots the frame from the first to the second position and maintains the biasing force on the edge contacting roll against the edge when the frame is in the second position. An actuator controls the air cylinder to pivot the frame to the first position when selected portions of the glass edge are at a selected location relative to the edge contacting roller.

The present invention also provides a method of reducing tip curl of glass sheets supported on a shaping rail of a bending mold. Selected edge portions of the hot glass sheet are contacted with a roller that is biased against the selected edge portions to force the edge portions against a shaping rail of the mold. The roller contacts the selected edge portions as mold is conveyed through a heating lehr. The roller pivots from a first position wherein the roller is spaced from the select edge portions of the hot glass sheet, to a second position wherein the roller contacts the edge. The angle of said roller is maintained throughout its contact with the glass sheet edge.

DESCRIPTION OF PREFERRED EMBODIMENT

A description of a preferred embodiment of the present invention read in conjunction with the drawings should enable the reader to understand this invention more clearly.

Figure 1A:
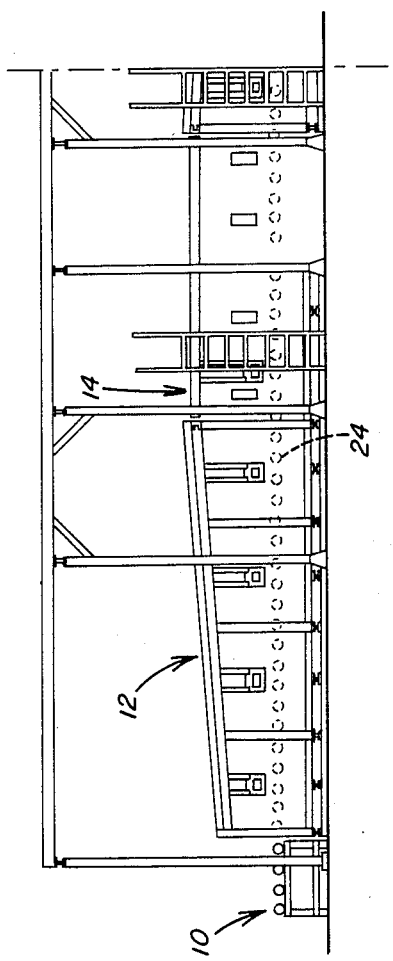
FIGS 1A and 1B are longitudinal side views of a typical bending lehr showing the loading, heating, shaping, annealing, and unloading sections.
Figure 1B:
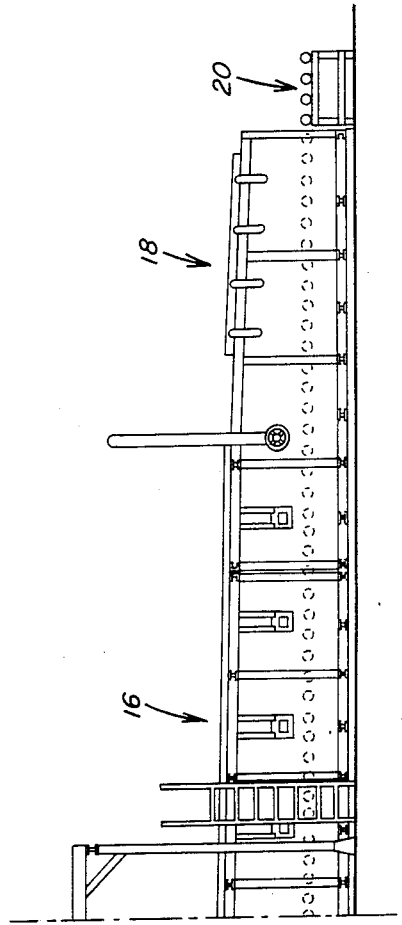

Referring to FIGS 1A and 1B there is shown a heating, shaping and annealing lehr for shaping glass sheets. The lehr begins downstream with a loading zone 10 and includes an initial heating zone 12 of tunnel type configuration, a gravity bending zone 14 downstream of the initial heating zone 12, an annealing zone 16, and a cooling zone 18 in end-to-end relation in the downstream portion of the lehr. An unloading zone 20 is beyond the lehr.

Figure 2:
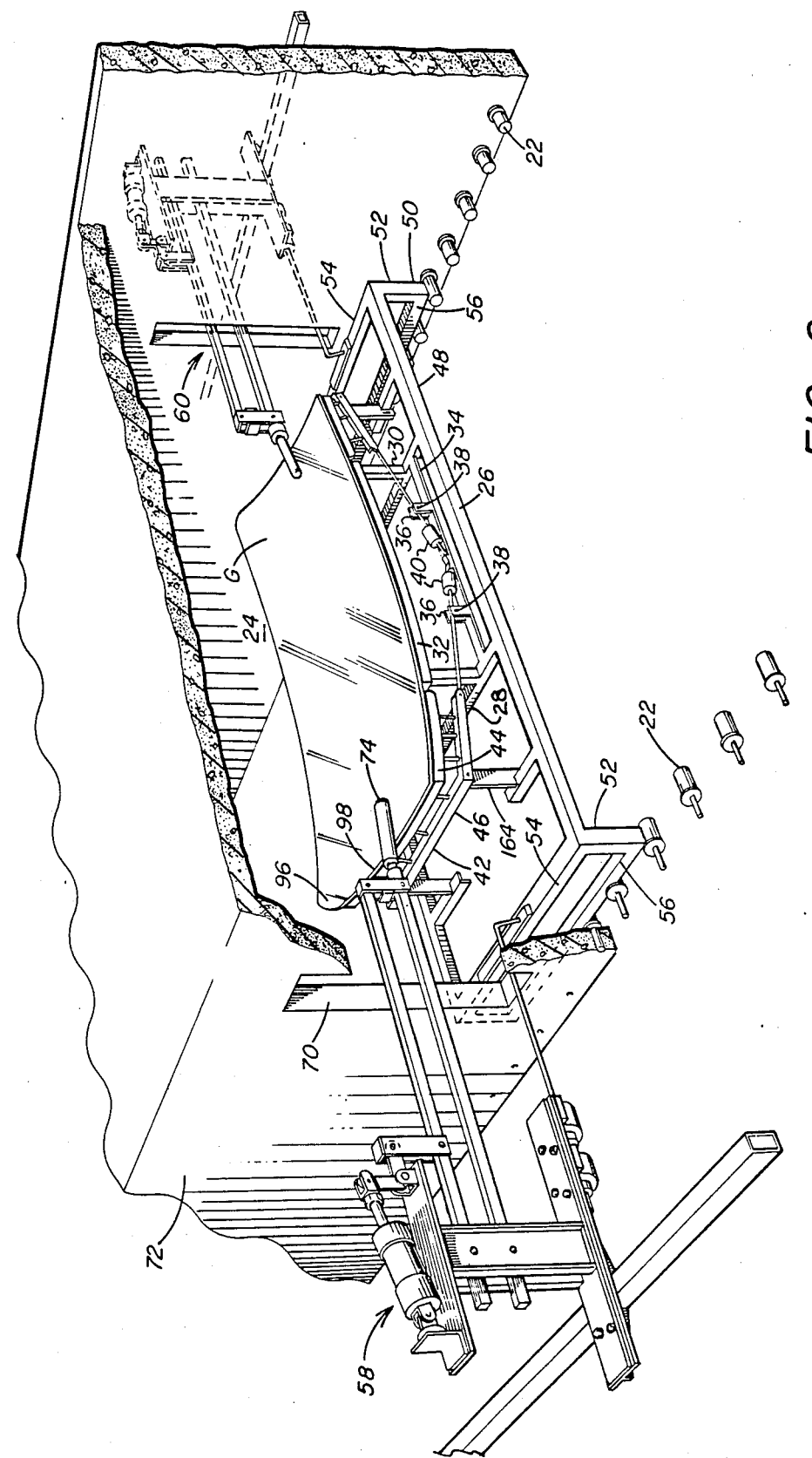
FIG. 2 is a perspective cross-sectional view taken through the shaping station of the lehr showing hot glass sheets supported on a ring mold and the preferred glass tip roller assembly of the present invention, with portions removed for clarity.

A conveyor comprised of a plurality of stub rolls 22 disposed in transversely opposing longitudinally spaced relation extends the entire length of the lehr and defines a path of movement along a longitudinal reference line. As illustrated in FIG. 2 each stub roll 22 is mounted on a shaft that extends through a sidewall of the lehr and is connected to a conveyor drive means (not shown). The conveyor may be divided into a number of sections, each driven from its own drive means through conventional drive rod and gear means or chain drives or the conveyor sections may be driven from a common drive through clutches in any manner well known in the art.

The lehr includes a plurality of glass support molds 24, one of which is shown in FIG. 2, each being supported by a mold carriage 26. Although not limited in this invention, the mold 24 is an articulating mold and includes a pair of cross bars 28 which support a number of vertical posts 30. The vertical posts 30 support the ends of longitudinal shaping rails 32. The surface contours of the shaping rails 32 conform to the shape desired along the longitudinal edges of the glass sheet G supported for bending on the mold 24. Longitudinal members 34 interconnect the cross bars 28 to form a framelike structure adapted to be supported on the mold support carriage 26 for movement in a direction transverse to the length of the glass sheet G supported on the mold 24 through a conventional glass bending lehr. Mounted on members 34 are hinge support posts 36 each of which supports a hinge 38 which includes a weighted lever arm 40 adaptable for pivoting in a substantially vertical plane about an axis defined by the associated hinge 38.

The mold 24 is also provided with two end mold sections 42. Each of the end mold sections 42 comprises an end rail section 44 whose upper edge forms a surface conforming an elevation and outline to the shape desired for one or the other end portion of the glass sheets G to be shaped on the mold 24. Each end mold section 42 also includes an outrigger 46 rigidly attached to the under surface of the end rail section 44. The outrigger 46 extends outward of the end mold section 42 toward one of the hinges 38 and is attached to the weighted lever arm 40. When the glass sheet becomes heat softened, the lever arm 40 provides a closing pressure that causes the end mold sections 42 to pivot from a spread position, in which they support the flat glass sheet G, into a closed position, where the upper edges of the end mold sections 42 form continuations of the shaping surfaces provided along the upper edges of the shaping rails 32 so that the shaping rails 32 and 44 form an outline shaping surface to which the glass sheet G conforms when shaped.

Cross bars 28 are mounted on support beams 48 of the mold support carriage 26. The end portions of the cross bars 28 are rigidly attached to rigid end frame 50 which includes vertical posts 52, upper carriage rail 54 and lower carriage rail 56. Lower carriage rail 56 rides on the driven stub rolls 22 of the lehr, as the rolls convey the mold 24 through the lehr as previously discussed.

Figure 3:
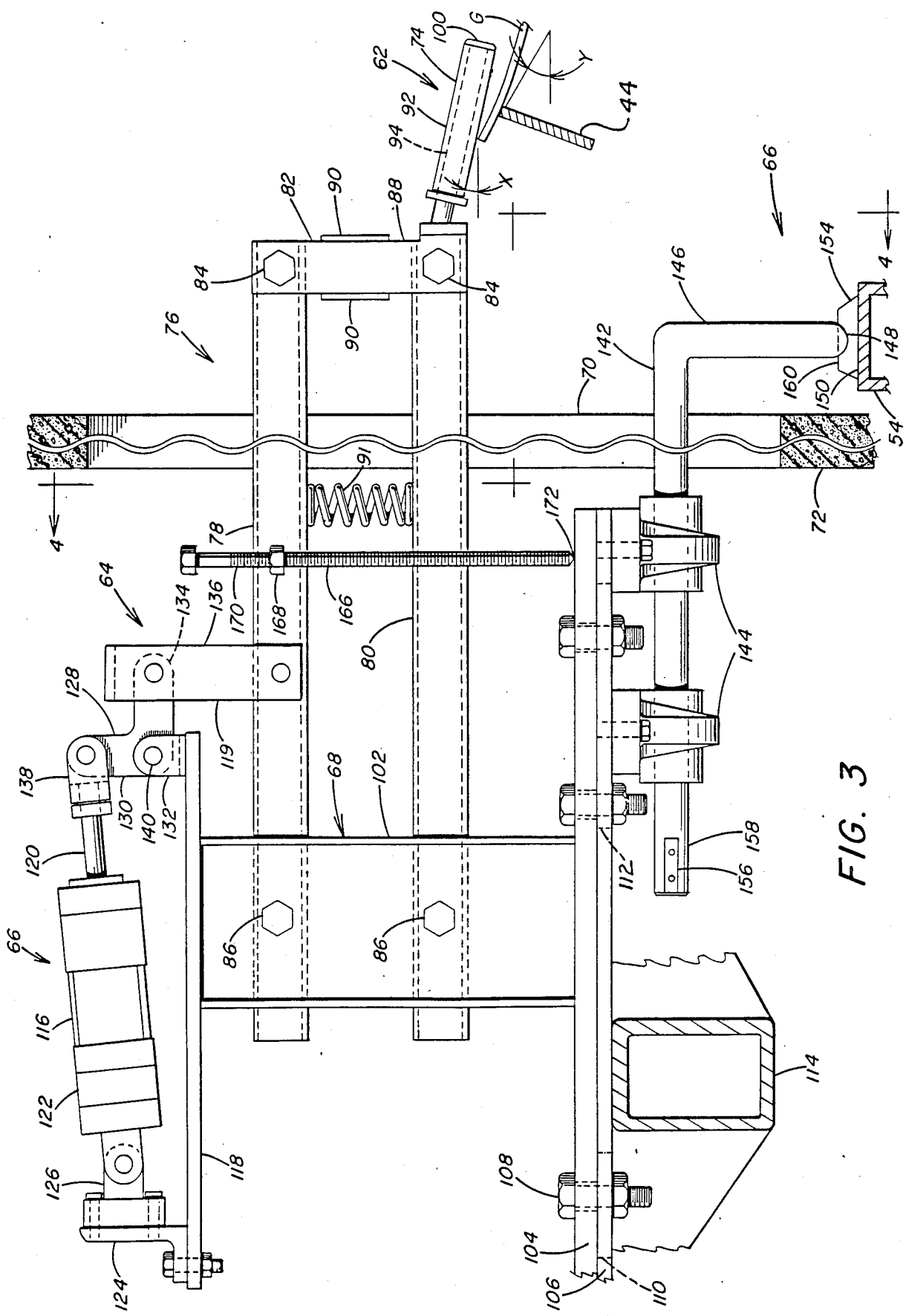
FIG. 3 is a elevational view of the preferred glass tip roller.
Figure 4:
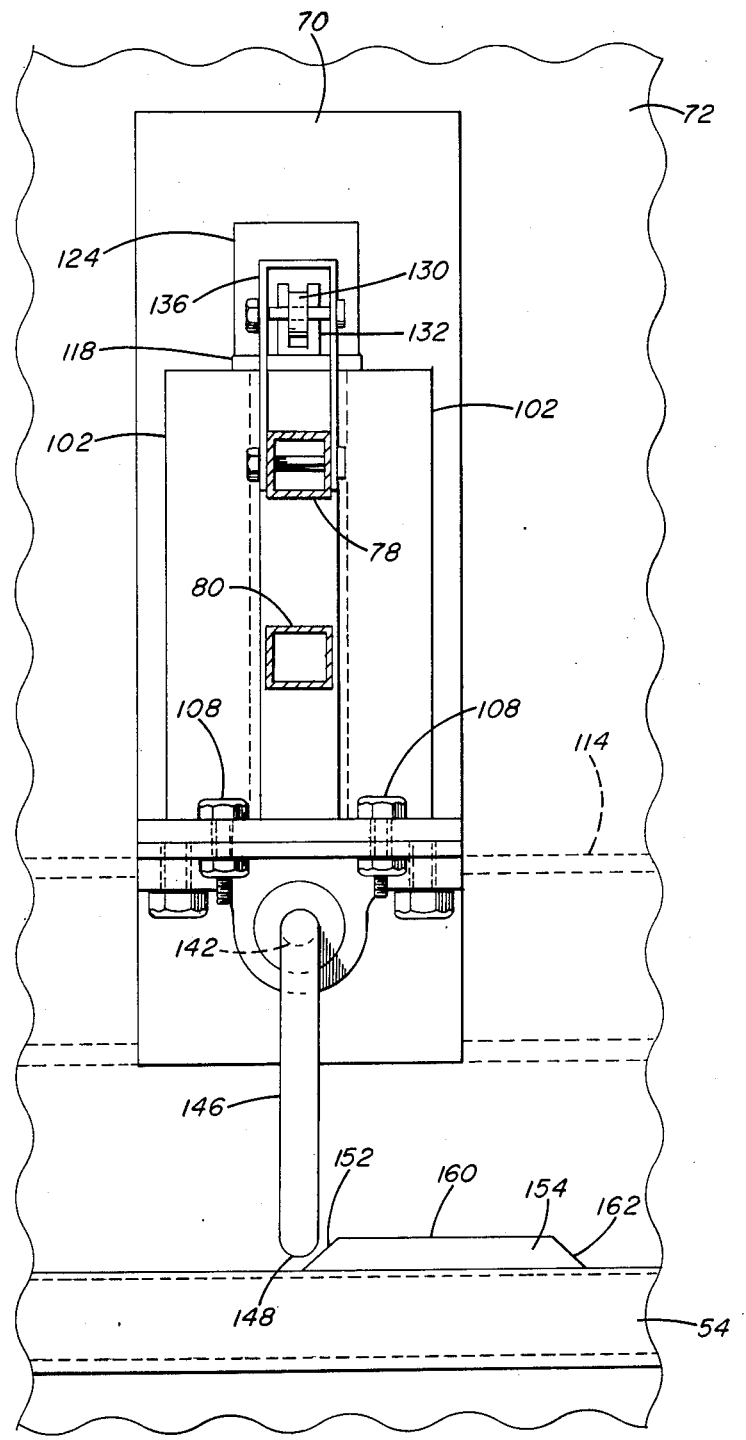
FIG. 4 is a view through line 4—4 of FIG. 3.

FIG. 2 shows glass roller assemblies 58 and 60 which are the subject of this invention as they are positioned at the lehr relative to the support mold 24 and carriage 26. The assemblies 58 and 60 are similar in construction. The following discussion will be directed to the assembly 58 with the understanding that the discussion is applicable to assembly 60 unless indicated otherwise. Referring now to FIGS. 3 and 4, the glass roller assembly 58 includes a glass edge roller means 62 to contact the edge of the glass sheet G, a positioning and biasing means 64 to maintain the edge roller means 62 in contact with the glass sheet edge, an actuating means 66 to activate the positioning and biasing means 64 and a support stand 68.

The edge roller means 62 which contacts the edge of the glass sheet G on end mold section rail 44 (see FIG. 2) is inserted into the lehr through opening 70 in lehr wall 72 and includes a glass contacting roller 74 mounted on one of the short sides of a parallelogram-shaped linkage assembly 76. The linkage assembly 76 which is comprised of an upper arm 78, a lower arm 80 and a roller bracket 82, has corresponding ends of the upper arm 78 and lower arm 80 pivotally connected to the roller bracket 82 and the support stand 68, preferably by nut and bolt assemblies 84 and 86, respectively, such that the upper arm 78 is parallel to the lower arm 80. The roller bracket 82 preferably includes side plates 88, only one of which is shown in FIG. 3, to which bolt and nut assembly 84 attach the bracket 82 to the upper arm 78 and lower arm 80, and cross plate members 90. Roller 74 is preferably connected to the lower portion of the bracket 82. If required, a spring 91 can be positioned between upper arm 78 and lower arm 80, and between support stand 68 and roller bracket 82 to remove any slack in the assembly 76. Although not limited in this invention, the surface of the roller 74 which contacts the edge of the glass sheet G is a ceramic material. In the preferred embodiment, a ceramic tube 92 slips over an inner support shaft 94 and is held in place by any convenient manner to allow rotation thereabout. It has been found that the larger the diameter of the ceramic tube 92, the more easily it rotates about shaft 94. As an alternative, a metal tube used with high temperature bearings could be used to replace the ceramic tube 92.

With the roller 74 in a horizontal orientation, the biasing force on the glass edge tends to buckle the glass sheet as the roller 74 approaches tip 96 of the glass sheet G along A post edge 98 (see FIGS. 2 and 3). To help eliminate the buckling, the roller 74 is preferably inclined downward at an angle X to reduce this force. FIG. 3 illustrates the inclination of the glass sheet G as it is supported on the end rail section 44. This angle is commonly referred to as the approach angle Y. As can be seen, if the roller inclination angle X of the roller 74 is greater than the approach angle Y, inboard end 100 of the roller 74 would contact the upper surface of glass sheet G rather than the surface of the roller 74 contacting edge 98, resulting in marking of the glass sheet G or marking of a paint band (not shown) around the perimeter of the glass sheet G. As a result, angle X should be less than angle Y.

Although not limited by this invention, in the preferred embodiment the support stand 68 includes a pair of spaced channel members 102 with upper arm 78 and lower arm 80 rotatably positioned therebetween. Channels 102 are secured on a mounting plate 104 which is slidably secured on base plate 106 via nut and bolt assemblies 108. Slot pairs 110 and 112 in the base plate 106 allow support stand 68 and base plate 104 to slide toward and away from the lehr wall so that the roller 74 can be properly aligned with the edge 98 of the glass sheet G to be shaped, or completely removed from engagement with the glass sheet G. The base plate 106 is rigidly attached to a tube support 114 which supports the glass roller assembly 58 outside the lehr.

The linkage assembly 76 is pivoted by the positioning and biasing means 64, which preferably is an air cylinder 116 mounted on cylinder support plate 118 which is the support stand 68, and linked to the upper arm 78 through linkage arrangement 119. As shown in FIG. 3, the cylinder end 122 of air cylinder 116 rotatably connected to support angle 124 and eye bracket 126 on cylinder support plate 118. Reciprocating arm end 120 is pivotally pinned to leg portion 128 of L-shaped link 130 which in turn is pivotally mounted through mount 132 on plate 118. The other leg portion 134 of L-shaped link 130 is pinned to support frame link 136 which is pivotally connected to upper arm 78 of assembly 76. As the reciprocating arm 120 of the air cylinder 116 retracts, the L-shaped link 130, which is fastened to reciprocating arm end 120 through a clevis member 138, pivots counterclockwise about pin 140 on the mount 132. This pivoting action translates into a counterclockwise rotation, as viewed in FIG. 3, of the linkage assembly 76 about the support stand 68 through link 136 which is pivotally connected at one end to the L-shaped link 130, and the other end to the upper arm 78. When the reciprocating arm end 120 extends outwardly from the air cylinder 116, the previously described action is reversed: the link 130 pivots clockwise, as viewed in FIG. 3, about pin 140, and assembly 76 pivots clockwise about nut and bolt assemblies 86.

Although the air cylinder 116 is the preferred positioning and biasing means, other mechanisms such as hydraulic cylinders or a cam and spring arrangement can be used to move and bias the roller 74.

It should be noted that as the assembly 76 is rotated by the air cylinder 116 or by the roller 74 contacting and riding the edge 98 of the glass sheet G, the angle X of the roller 74 remains constant due to the geometric properties of the assembly 76. The assembly 74 is a parallelogram, that is, a four sided figure with opposite sides parallel and equal. As the assembly 76 rotates, it maintains a parallelogram shape. The nut and bolt assemblies 86 maintain corresponding points on the upper arm 78 and lower arm 80 at support stand 68 in an orientation, one vertically disposed above the other so the orientation of the roller bracket 82 also remains vertical as the assembly 76 rotates. Since the roller 74 is fixed to the to the bracket 82, the angle X of the roller 74 remains constant.

With continuing reference to FIGS. 3 and 4, the air cylinder 116 is activated by actuator means 66 which includes an elongated L-shaped pivoting trip arm 142 mounted to the underside of base plate 106 by pillow blocks 144. End 146 of the trip arm 142 is positioned within the lehr and extends downward with a tip portion 148 generally aligned with and terminating adjacent to the upper surface 150 of the upper carriage rail 54 of the rigid end frame 50. As the mold support carriage 26 is conveyed through the lehr, the tip portion 148 contacts leading end 152 of a trip plate 154 mounted on the upper surface 150 of the upper rail 54 of the carriage 26 causing the trip arm 142 to rotate clockwise, as viewed in FIG. 4, about an axis defined by the pillow blocks 144. This rotation of trip arm 142 rotates a tab 156 at end 158 of the trip arm 142 into contact with a microswitch (not shown) positioned in close proximity to the tab 156, which activates the air cylinder 116. After this initial rotation, the tip 148 rides along the top surface 160 of trip plate 154 and maintains its rotated position so that the tab 156 remains in contact with the microswitch. As the mold support carriage 26 continues to move through the lehr, the tip 148 slides down trailing end 162 of the trip plate 154 allowing the trip arm 142 to rotate counterclockwise, as viewed in FIG. 4, thus rotating the tab 156 to its initial position, breaking its contact with the microswitch and deactivating the air cylinder 116. The length of the trip plate 154 and the conveying speed of the mold support carriage 26 determines the amount of time that the tab 156 maintains contact with the microswitch and thus the time interval that the air cylinder 116 remains activated.

The reciprocating action of the air cylinder 116 is controlled by the aforementioned microswitch (not shown). When end portion 146 of the trip arm 142 is in a vertical position and tab 156 is not in contact with the microswitch, the air cylinder 116 is retracted and the roller 74 is in a raised position. When the microswitch is engaged by the tab 156, due to the rotation of the trip arm 142 upon contact with the trip plate 154, the air cylinder 116 is pressurized causing reciprocating arm end 120 to extend outwardly, moving the roller 74 downward into engagement with the glass sheet G.

It is obvious that there are other ways well known in the art to activate the air cylinder 116. For example, two activator tabs could replace trip plate 154 such that the first activator tab would rotate trip arm 142 to contact a microswitch which would activate air cylinder 116. Pressure in the cylinder could be maintained after tab 156 rotates out of contact with the microswitch until the microswitch is contacted a second time, due the rotation of the trip arm upon contact with the second activator tab. Another alternative would include the use of sensors and timers that would locate the exact position of the glass sheet G and support carriage 26 within the lehr, and activate and deactivate an air cylinder based on a timing sequence.

As stated earlier, the air cylinder 116 is used to raise and lower roller 74 as well as maintain pressure on the edge of the glass sheet G through contact with the roller 74 to force it against the mold end section rails 44 in critical sections. Flow control for the air cylinder flow lines (not shown) automatically equalizes pressure in the air cylinder 116 as the roller 74 contacts the glass edge 98 and rotates the assembly 76 so that the pressure applied by the roller 74 remains constant. The flow control for the air cylinder 116 also allows the pressure applied to the glass edge 98 to be varied if required.

In operation, the shape of the glass sheet G on the glass support mold 24 determines if and when the roller 74 must be moved via the air cylinder 116. Generally, glass sheets are conveyed through the lehr with the leading edge being the top edge of the sheets as installed. If the shape of the glass sheet G is such that the inboard end 100 of angled roller 74 would hit glass edge 98 and/or shaping rail 44 causing chipping or marking of the glass sheet G, movement of the glass sheet G on the rail 44, or damage to the roller 74, the roller 74 must be raised to allow this critical area of the mold 24 and edge 98 to pass outboard of the inboard end 100 of the roller 74. The roller 74 can thereafter be lowered until it contacts the glass sheet G.

The same considerations are present in determining when the roller 74 should be lifted off the glass sheet after it has ridden up the glass edge 98 and past the glass tip 96. The roller 74 can be raised after it reaches its maximum elevation at the tip 96, or can be allowed to slide down the trailing edge of the glass sheet. As stated earlier, the length of the trip plate 154 and the lehr conveying speed will determine how long the roller 74 will contact the glass sheet G.

If the glass shape is such that there will be no destructive interference, the roller 74 and assembly 76 can be maintained in a constant lowered position.

In order to provide greater flexibility and accuracy in positioning changes as is required in glass pattern changeover, the positioning of the glass roller assembly 58 can be automated in any manner well known in the art. For example, individual drives can be positioned to slide the assembly 58 in a direction perpendicular to the lehr. Cylinders or cam assemblies can be used to raise or lower the assembly 58 or to tilt it to change the angle X of the roller 74, if required. The entire positioning arrangement could be controlled by a preprogrammed computer that would automatically reposition the assembly 58 when a new glass pattern is being formed.

It has been found that on occasion, the downward force exerted by the air cylinder 116 on the roller 74 to press the glass edge against the end rail section 44 is sufficient to overcome the closing pressure provided by the weighted lever arms 40 of the end mold section 42 with the result that the end mold sections 42 open and the force on the glass sheet G is reduced. To prevent this, a hinge locking member 164 is attached to the end mold section 42 to lock it in a closed position after it has closed normally (see FIG. 2). This allows the tip 96 and glass edge 98 to be pressed against a rigid mold band.

During testing, it was found that the assembly 58 worked best when placed at the end of the last lehr heating zone just prior to the shaped glass sheet entering the annealing zone 16. At this point, the glass is soft enough to be formed with the roller 74, yet it hardens quickly once it passes the roller 74 and enters the annealing zone 16, preventing the tip curl from reforming. Under production conditions, it may be advantageous to position several assemblies 58 in the lehr. Each succeeding roller 74 of the assembly 58 would provide some additional force and movement to the glass until the tip curl is flattened.

In addition, to further limit the downward movement of the roller 74, an adjustable stop 166 is mounted on the assembly 76. Although not limited by this invention, adjustable stop 166 includes a nut 168 rigidly secured to the upper arm 78 and threaded bolt 170 passing therethrough such that the lower tip 172 of the bolt 170 abuts mounting plate 104. The downward travel of the roller 74 is adjusted by rotating threaded bolt 170.

Figure 5:
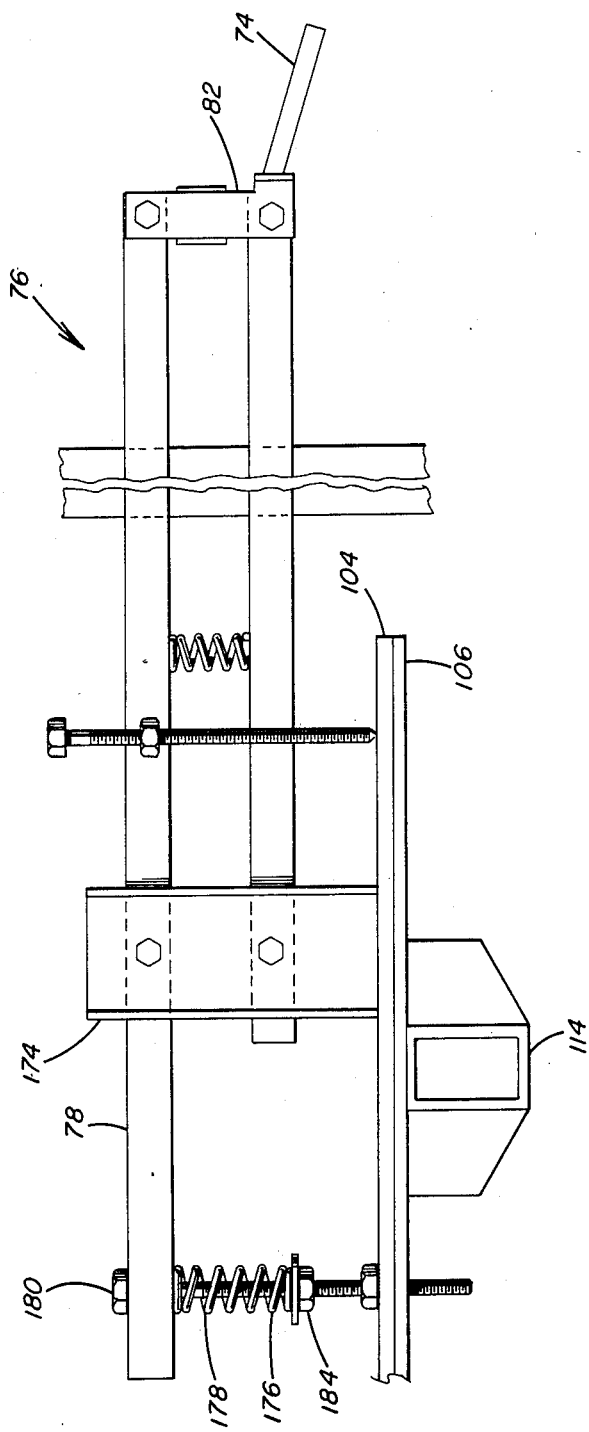
FIG. 5 is an alternate embodiment of the present invention.

An alternate embodiment of the present invention is shown in FIG. 5. This embodiment retains the parallelogram-shaped assembly 76, the roller 74, the roller bracket 82 and a modified support stand 174, but an adjustable spring assembly 176 replaces the air cylinder 116 to provide the biasing force to the roller 74. A spring 178 of the spring assembly 176, which is mounted to push upward on the upper arm 78, is held in position by bolt assembly 180 and is adjusted by rotating nut 182 upward to increase the spring biasing force and downward to decrease the spring biasing force. It is obvious that a spring assembly could be mounted between roller 74 and support stand 174 to pull lower arm 80 downward to achieve the same biasing result.

The forms of this invention shown and described in this disclosure represent illustrative embodiments, and it is understood that various changes may be made without departing from the scope of the invention.

We claim:

1. An apparatus for reducing the movement of an edge of a glass sheet away from a shaping rail of a bending mold while said glass sheet is conveyed along a path through a heating lehr on the bending mold comprising:
   an edge roller means; and
   means for biasing said roller means against said edge to urge said edge against said shaping rail as said glass sheet moves relative to said roller means through said lehr.

2. The apparatus as in claim 1 wherein said roller means includes a pivoting frame, a glass edge contacting roller mounted on said frame, and means for pivoting said frame from a first position wherein said roller is spaced from said glass edge to a second position wherein said roller engages said glass edge.

3. The apparatus as in claim 2 wherein said frame includes two pairs of members pivotally connected to one another to provide a parallelogram in shape, wherein members of each pair remain parallel to one another as said frame pivots.

4. The apparatus as in claim 3 wherein said frame pivots in a plane generally perpendicular to the lehr.

5. The apparatus as in claim 3 wherein one of said pairs includes first and second opposing arm members, vertically disposed and spaced one above another, and the other of said pairs includes first and second opposing side members, each of said side members pivotally connected at opposite ends to one of said first or second arm members, wherein said first arm member is generally parallel to said second arm member and said first side member is generally parallel to said second side means, and further wherein said first side member remains in a generally vertical position as said frame pivots.

6. The apparatus as in claim 5 wherein said glass edge contacting roller maintains a constant orientation relative to a given one of said side members of said frame while in contact with said edge.

7. The apparatus as in claim 6 wherein said contacting roll is positioned on and extends outwardly from said second side member.

8. The apparatus as in claim 7 wherein said glass edge contacting roller is inclined downward.

9. The apparatus as in claim 8 wherein the outwardly extending end of said contacting roll is spaced from the upper major surface of said shaped glass sheet.

10. The apparatus as in claim 8 wherein said biasing means includes an air cylinder pivotally connected to said frame to pivot said frame from said first position to said second position and maintain a biasing force on said contacting roll against said edge when said frame is in said second position.

11. The apparatus as in claim 10 wherein said biasing force varies when said frame is in said second position.

12. The apparatus as in claim 10 further including an actuator means to deactivate said air cylinder to pivot said frame to said first position when first selected portions of said glass edge are at a first selected location and activate said air cylinder to pivot said frame to said second position when said selected portions of said glass edge are at a second selected location.

13. A method of reducing tip curl of glass sheets supported on a shaping rail of a bending mold, said rail being positioned slightly inboard of the perimeter of said sheets and conveyed along a path through a heating lehr to heat said sheets to their deformation temperature wherein said sheets sag and the perimeter of said glass sheets substantially conforms to the shape of said shaping rail, comprising:

contacting selected edge portions of said hot glass sheets with a roller means as said sheet moves along said path relative to said roller means; while
biasing said roller means against said selected edge portions to force said edge portion against said shaping rail of said mold as said sheet moves along said path relative to said roller means.

14. The method as in claim 13 further including the step of cooling said glass before said edge portion lifts off said shaping rail.

15. The method as in claim 13 wherein said contacting step includes positioning said roller means on selected portions of said glass edge as said mold is conveyed through said lehr and moving said roller means along the edge of said glass sheet.

16. The method as in claim 15 wherein said contacting step includes pivoting said roller means from a first position wherein said roller means is spaced from said select edge portions of said hot glass sheet, to a second position wherein said roller means contacts said edge.

17. The method as in claim 16 wherein said bending mold includes at least one pivoting end section and further wherein prior to said contacting step, including the steps of:
pivoting said end section of said mold from an open position wherein a substantial portion of said glass sheet is spaced from said shaping rail, to a closed position wherein said glass sheet conforms to the shape of said shaping rail; and
locking said end section in said closed position.

18. The method as in claim 16 further including the step of maintaining the angle of said roller means throughout said contacting step.

19. The method as in claim 18 further including the step of varying said force on said edge portions during said biasing step.

20. The method as in claim 18 further including the step of maintaining a constant force on said edge portions during said biasing step.

* * * * *